US011001526B2

(12) United States Patent
Eliason et al.

(10) Patent No.: US 11,001,526 B2
(45) Date of Patent: *May 11, 2021

(54) PAVER ADHESIVE AND METHOD OF LAYING PAVERS USING SAME

(71) Applicant: PAVER TECHNOLOGIES LLC, Vero Beach, FL (US)

(72) Inventors: William Eliason, Vero Beach, FL (US); Timothy Berry, Vero Beach, FL (US)

(73) Assignee: PAVER TECHNOLOGIES LLC, Vero Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,236

(22) Filed: Feb. 3, 2020

(65) Prior Publication Data
US 2020/0172439 A1 Jun. 4, 2020

Related U.S. Application Data

(63) Continuation-in-part of application No. 16/415,371, filed on May 17, 2019, now Pat. No. 10,550,039, which is a continuation of application No. 15/845,809, filed on Dec. 18, 2017, now Pat. No. 10,294,159, which is a continuation of application No. 15/697,726, filed on Sep. 7, 2017, now Pat. No. 9,885,157, which is a continuation of application No.
(Continued)

(51) Int. Cl.
*E01C 5/00* (2006.01)
*C04B 28/04* (2006.01)
*C04B 111/00* (2006.01)

(52) U.S. Cl.
CPC .............. *C04B 28/04* (2013.01); *E01C 5/003* (2013.01); *C04B 2111/00672* (2013.01)

(58) Field of Classification Search
CPC ........... C04B 28/04; C04B 2111/00672; E01C 5/003
USPC ..................................................... 404/17–45
See application file for complete search history.

(56) References Cited

U.S. PATENT DOCUMENTS

| 1,347,654 A | 7/1920 | Parrish |
| 1,452,120 A | 4/1923 | Lamb |
| 1,619,733 A | 3/1927 | Jeppson |

(Continued)

FOREIGN PATENT DOCUMENTS

| AU | 2005243604 A1 | 6/2006 |
| WO | 2013/086722 A1 | 6/2013 |

OTHER PUBLICATIONS

International Search Report and Written Opinion of the International Searching Authority for related International Patent Application No. PCT/US2016/060910 dated Jan. 25, 2017.
(Continued)

*Primary Examiner* — Raymond W Addie
(74) *Attorney, Agent, or Firm* — Troutman Pepper Hamilton Sanders LLP; James E. Schutz; Micah B. Hensley

(57) ABSTRACT

Disclosed herein are paver adhesives including dry concrete mixes. The paver adhesive can include cement, silica sand, alumina silicate, and latex or acrylic polymer. The paver adhesive can be configured to be applied to a substrate in a dry state. The paver adhesive can be configured to become hydrated subsequent to pavers being installed over the paver adhesive, and the paver adhesive can be configured to cure and adhere paver tiles to the substrate following the hydrating.

16 Claims, 1 Drawing Sheet

Related U.S. Application Data

15/288,433, filed on Oct. 7, 2016, now Pat. No. 9,790,650.

(56) References Cited

U.S. PATENT DOCUMENTS

| | | | |
|---|---|---|---|
| 3,683,578 | A | 8/1972 | Zimmerman |
| 4,421,797 | A | 12/1983 | Koehne |
| 4,430,463 | A | 2/1984 | Mullenax |
| 4,699,834 | A | 10/1987 | Schiffer |
| 4,963,055 | A | 10/1990 | Sims, Jr. |
| 5,069,721 | A | 12/1991 | Tamura et al. |
| 5,111,627 | A | 5/1992 | Brown |
| 5,839,251 | A | 11/1998 | Weinstein |
| 6,231,665 | B1 | 5/2001 | Kerkar et al. |
| 6,439,805 | B1 | 8/2002 | Ronin |
| 6,784,229 | B2 | 8/2004 | Rooshenas |
| 8,722,772 | B2 | 5/2014 | Moussios et al. |
| 9,169,382 | B2 | 10/2015 | Kim-Habermehl et al. |
| 9,624,131 | B1 | 4/2017 | Dubey et al. |
| 2007/0079733 | A1* | 4/2007 | Crocker .................. C04B 28/04 106/711 |
| 2008/0066654 | A1 | 3/2008 | Fraser |
| 2009/0162602 | A1 | 6/2009 | Cottier et al. |
| 2013/0284069 | A1 | 10/2013 | Dubey |
| 2015/0051312 | A1 | 2/2015 | Chen et al. |
| 2015/0203409 | A1 | 7/2015 | Grisoni |
| 2018/0162777 | A1* | 6/2018 | White ...................... C04B 7/32 |

OTHER PUBLICATIONS

Thinset Mortar Selection [online]. FloorsTransformed.com [retrieved on Dec. 16, 2009]. Retrieved from the Internet: <URL: www.floorstransformed.com/choosethinset.html>.

Underlay-SLU Self Leveling Underlayment [online]. MERKRETE [retrieved on Dec. 16, 2009]. Retrieved from the Internet: <URL: www.merkrete.com/merkrete/underlay-SLU.htm>.

Re: Pavers over concrete patio? In DIY Chatroom (DIY Home Improvement Forum) [online]. [retrieved on Dec. 15, 2009]. Retrieved from the Internet: <URL: www.diychatroom.com/f16/pavers-over-concrete-patio-2690/>.

Laying Flags: Bedding Materials [online]. ThePavingExpert.com [retrieved on Dec. 11, 2009]. Retrieved from the Internet: <URL: www.pavingexpert.com/layflag3.htm>.

Polymer Concrete and Mortar [online]. GlobalSpec.com [retrieved on Dec. 16, 2009]. Retrieved from the Internet: <URL: www.globalspec.com/leammore/materials_chemicals_adhesives/industrial_adhesives/polymore_concrete_mortars_cement_products>.

Quikrete Multi-Purpose Thin Set Cement, 50 Lbs White [online]. Aubuchon Hardware [retrieved Dec. 10, 2009]. Retrieved from the Internet: <URL: www.paint-and-supplies.hardwarestore.com>.

Technical Services: Mortar, Thinset, Dryset, Polymer-Modified Mortar [online]. The Council of North America, Inc. [retrieved on Dec. 16, 2009]. Retrieved from the Internet: <URL: www.tileusa.com/thinset-mortar_faq.htm>.

\* cited by examiner

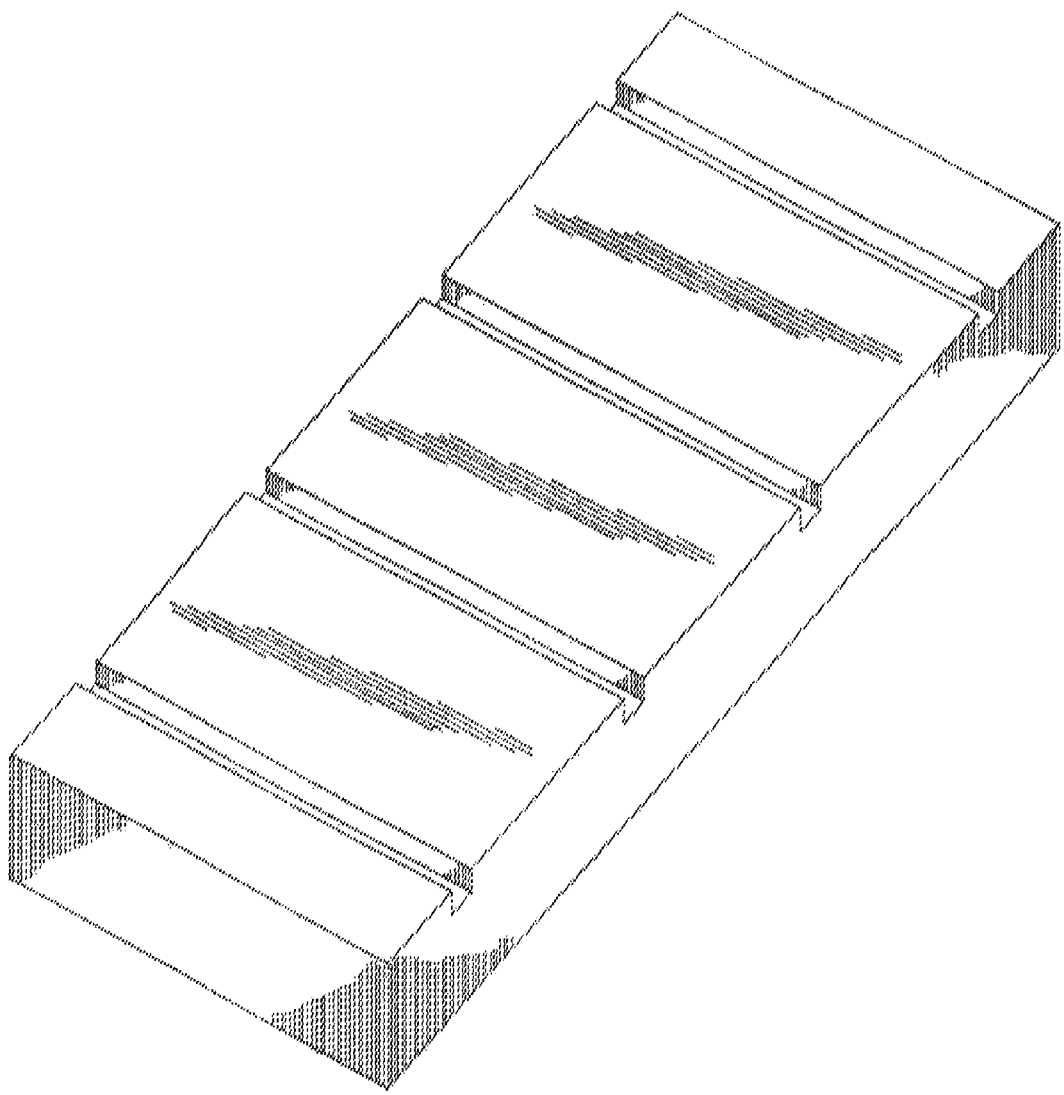

PAVER ADHESIVE AND METHOD OF LAYING PAVERS USING SAME

CROSS-REFERENCE TO RELATED APPLICATIONS

This application is continuation-in-part and claims the benefit, under 35 U.S.C. § 120, of U.S. patent application Ser. No. 16/415,371, filed 17 May 2019 and entitled "PAVER ADHESIVE AND METHOD OF LAYING PAVERS," which is a continuation and claims the benefit, under 35 U.S.C. § 120, of U.S. patent application Ser. No. 15/845,809, filed 18 Dec. 2017 and entitled "PAVER ADHESIVE AND METHOD OF LAYING PAVERS," which is a continuation and claims the benefit, under 35 U.S.C. § 120, of U.S. patent application Ser. No. 15/697,726, filed 7 Sep. 2017 and entitled "PAVER ADHESIVE AND METHOD OF LAYING PAVERS," which is a continuation and claims the benefit, under 35 U.S.C. § 120, of U.S. patent application Ser. No. 15/288,433, filed 7 Oct. 2016 and entitled "PAVER ADHESIVE AND METHOD OF LAYING PAVERS," the entire contents and substance of which are incorporated herein by reference in their entirety as if fully set forth below.

FIELD OF THE DISCLOSURE

The disclosed technology includes paver adhesives, such as dry concrete mixes, as well as methods for laying paver tiles using such paver adhesives. Each disclosed paver adhesive is configured to be distributed on a substrate (e.g., a sidewalk, concrete pad, driveway, stone, or other solid surface) while the paver adhesive is in a dry state, such that bricks, paver bricks, pavers, or paver tiles (referred to generally herein as "pavers" or "paver tiles") can be laid atop the paver adhesive while the paver adhesive is still in the dry state, and the paver adhesive can be hydrated after the pavers have been laid. Subsequent to hydration and curing, the disclosed paver adhesives can provide a strong and durable adhesion between the pavers and the substrate, and the paver adhesives can withstand vehicular traffic without significant cracking, releasing or otherwise degrading.

BACKGROUND

Many homeowners or proprietors may wish to replace their old concrete driveway with a paver tile driveway. Conventionally, this process comprises breaking and digging up the existing concrete driveway and its base. The old concrete and base material must then be removed for disposal.

The base material, typically a limestone gravel, can then be replaced and compacted. The base material is then typically covered with a layer of sand, which is compacted and leveled as a layer to support the pavers. The pavers can then be laid on top of the leveled sand layer. To prevent shifting or other movement of the pavers after placement, at least some of the pavers must be secured. It is commonplace to secure at least the pavers at the edges of area being paved, such as by a concrete edge, pavers set in concrete, or a metal or plastic fixed edge. Commonly, the pavers that are secured are thicker and more expensive than typical pavers. Accordingly, the process to convert a concrete (or any other material) driveway, sidewalk, or other area to one paved with pavers can be expensive, disruptive to existing landscaping, and time consuming.

Further, there is no conventional method for reliably installing 0.75 inch to 1.5 inch concrete pavers over a concrete driveway for use by vehicular traffic. Pavers are not generally designed to set in cement or mortar over existing concrete applications, and relatedly, pavers are not conventionally made or installed for vehicular applications. To that end, the International Concrete Paver Institute (ICPI), which governs, qualifies, and mandates all specifications for use of paver tiles, does not acknowledge driveway overlays with paver tiles. Thus, ICPI certified installers are unlikely to install pavers over existing concrete pads.

Because typical pavers were developed for pedestrian use and not vehicular use, pavers are generally seen as an approved or acceptable product for remodeling pool decks, backyard patios, walkways and courtyards. However, pavers are not typically for vehicular applications, such as installation as an overlay on a driveway or other vehicular application. Using existing methods, it is likely that any pavers installed atop a driver, for example, would crack and break apart from the weight of the vehicle, as well as the various forces experienced by the pavers, such as those provided by any twisting and turning of the tires. Thus, using current methods, it is difficult to install pavers on concrete for vehicular use and provide a durable final product.

Moreover, regardless of the targeted use of the pavers (e.g., pedestrian, vehicular), any adhesion of the pavers to the underlying substrate (e.g., a concrete pad) typically requires the adhesive—typically, a concrete mix—to be pre-mixed. Using conventional practices, the pre-mixed concrete mix or other adhesive is hydrated prior to application on the ground or substrate. For adhesion to occur, the hydrated mix must be permitted to cure, which will ultimately fixedly attach the pavers to the underlying surface. However, this process can be messy, difficult, and cumbersome. Further, the installer is afforded only a certain amount of the time to install the pavers atop the adhesive before the adhesive cures and hardens. This time-based issue can become a burden in and of itself and can cause the installer to hurry the installation, which can lead to shoddy or inferior installation.

Accordingly, there is a need for a method of laying paver tiles over a surface or substrate such that the pavers will provide a durable and long-last surface for vehicular use. There is also a need for a paver adhesive for securely adhering pavers to a substrate or underlying surface.

SUMMARY

These and other problems can be addressed by the technology disclosed herein.

The disclosed technology includes a dry concrete mix for dry setting paver tiles, and the dry concrete mix can include cement, silica sand, alumina silicate, and a latex polymer and/or acrylic polymer. The cement can be in a concentration range from approximately 23 wt. % to approximately 70 wt. %. The cement can be in a concentration range from approximately 23 wt. % to approximately 70 wt. %. The cement can be in a concentration range from approximately 25 wt. % to approximately 60 wt. %. The cement can be in a concentration range from approximately 20 wt. % to approximately 40 wt. %. The cement can be in a concentration range from approximately 21 wt. % to approximately 30 wt. %. The cement can be in a concentration range from 23 wt. % to approximately 40 wt. %.

The silica sand can be in a concentration range from approximately 30 wt. % to approximately 79 wt. %. The silica sand can be in a concentration range from approximately 30 wt. % to approximately 78 wt. %. The silica sand can be in a concentration range from approximately 30 wt. % to approximately 74 wt. %. The silica sand can be in a concentration range from approximately 30 wt. % to approximately 70 wt. %.

The alumina silicate can be in a concentration range from approximately 0.5 wt. % to approximately 6 wt. %.

The latex polymer and/or acrylic polymer can be in a concentration range from approximately 0.5 wt. % to approximately 8 wt. %. The latex polymer and/or acrylic polymer can be in a concentration range from approximately 0.5 wt. % to approximately 5 wt. %. The latex polymer and/or acrylic polymer can be in a concentration range from approximately 23 wt. % to approximately 70 wt. %;

The disclosed technology also includes methods for laying paver tiles using the disclosed paver adhesive or concrete mixes.

Additional features, functionalities, and applications of the disclosed technology are discussed in more detail herein.

BRIEF DESCRIPTION OF THE FIGURE

FIG. 1 shows a paver tile used in an embodiment of the method, wherein the paver tile comprises a bottom surface defining grooves.

DETAILED DESCRIPTION

Unless stated otherwise, such as in the examples, all amounts and numbers used in this specification are intended to be interpreted as modified by the term "approximately" or the term "about." Likewise, all elements or compounds identified in this specification, unless stated otherwise, are intended to be non-limiting and representative of other elements or compounds generally considered by those skilled in the art as being within the same family of elements or compounds.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

The disclosed technology includes a paver adhesive or dry concrete mix that includes Portland cement, silica sand, alumina silicate, and a latex polymer and/or an acrylic polymer. As discussed more fully below, the disclosed paver adhesives can be used in methods for installing paver tiles on a substrate, such as a concrete pad, an asphalt pad, the ground, or some other substrate. The method can include distributing the paver adhesive in a dry form over an area to covered with paver tiles (e.g., a substrate), positioning the paver tiles over the paver adhesive, and hydrating the paver adhesive subsequent to positioning the paver tiles. Once hydrated, the paver adhesive can be permitted to cure and harden.

As used herein, the term "dry" as used with respect to a dry paver adhesive or a dry concrete mix refers to the paver adhesive or concrete mix lacking added water. That is, while the dry paver mix or dry concrete mix may contain some moisture (e.g., depending on the ambient humidity), the paver mix or dry concrete is still considered "dry" so long as water or hydrating fluids have not been added to the mix.

The disclosed technology includes paver adhesives or concrete mixes that are dry (packaged), no-mix, polymer-modified, cement-based mortars. The paver adhesives can be configured to be distributed or applied in a dry state and hydrated in situ subsequent to laying paver tiles over the dry concrete mix. That is, the disclosed paver adhesives are formulated such that paver tiles can be laid over the paver adhesive while the paver adhesive is in a dry form, and the paver adhesive can then be hydrated after some or all of the pave tiles are laid. This is in contrast to conventional approaches that require shear mixing of mortar with water before placement of paver tiles. It is conventionally thought that the shear mixing adds air to the mortar to control the curing period, which is thought to be necessary for ultimate strength of the cured mortar and for developing a strong bond with abutting objects, such as paver tiles.

The dry concrete mix comprises cement (e.g., Portland cement), silica sand, alumina silicate (e.g., perlite), and/or latex polymer and/or acrylic polymer. The dry concrete mix can include calcium carbonate. The Portland cement can include Type I cement in a concentration range between approximately 40 wt. % and approximately 60 wt. % and Type III cement in a concentration range between approximately 40 wt. % and approximately 60 wt. %. As will be appreciated, alumina silicate, perlite, or another material for water retention can promote water-retention in the eventually hydrated paver adhesive or concrete mix, which can aid in curing. Further, the latex and/or acrylic polymers can also promote water-retention and adhesion between the paver tiles and the underlying substrate.

The latex polymer and/or acrylic polymer can be a powder, such as a dry, redispersible powder. The latex polymer and/or acrylic polymer can include, but is not limited to, poly(ethylene-vinyl acetate), poly(vinyl acetate-ethylene) (VAE, VAc/E), poly(vinyl acetate/vinyl ester of versatic acid) (VAE/VeoVa, VAM/VeoVa), poly(styrene acrylate), poly(ethylene-vinyl acetate), acrylic homopolymer, acrylic copolymers, acrylic terpolymers, poly(acrylic esters), polyvinylidene chloride (PVAC), poly(styrene-butadiene), poly(styrene-butadiene) copolymers, poly (styrene-butadiene) terpolymers, or any useful combination thereof. Various types (chemical families) and grades of dry, redispersible latex and/or acrylic polymer powders can conceivably be used in the disclosed paver adhesive formulations without departing from the spirit of the disclosed technology. The combination of components in the disclosed paver adhesives and dry cement mix can provide ease of use and sufficient adherence between an underlying substrate and the paver tiles to prevent cracking of the tiles (e.g., due to vehicular use). As will be appreciated, the dry paver adhesives of the present disclosure can be spread more easily and conveniently as compared to wet mortars.

Qualities of the formulations can be influenced as desired by the concentration of certain materials. For example, increased concentrations of latex and/or acrylic polymers can improve adherence and ultimate performance of the paver adhesive, but this may also increase the cure time of the paver adhesive. Thus, it may be beneficial to increase the concentration of a component (e.g., alumina silicate) to regulate water evaporation and offset the increased cure time.

An example dry concrete mix can include Portland cement, silica sand, alumina silicate, and as poly(ethylene-vinyl acetate). As a more specific example, the dry concrete mix can include Portland cement in a concentration range from approximately 30 wt. % to approximately 60 wt. %, silica sand, alumina silicate (perlite) in a concentration range from approximately 1 wt. % to approximately 6 wt. %, and poly(ethylene-vinyl acetate) in a concentration range from approximately 1 wt. % to approximately 30 wt. %. As another example, the dry concrete mix can include Portland cement in a concentration range from approximately 30 wt. % to approximately 60 wt. %, silica sand in a concentration range from approximately 25 wt. % to approximately 60 wt. %, alumina silicate (perlite) in a concentration range from approximately 1 wt. % to approximately 6 wt. %, and poly(ethylene-vinyl acetate) in a concentration range from approximately 1 wt. % to approximately 30 wt. %.

As yet another example, the dry concrete mix can include Portland cement in a concentration range from approximately 40 wt. % to approximately 60 wt. %, silica sand, alumina silicate (perlite) in a concentration range from approximately 0.5 wt. % to approximately 3 wt. %, and poly(ethylene-vinyl acetate) in a concentration range from approximately 0.5 wt. % to approximately 5 wt. %. For certain applications, the dry concrete mix can include Portland cement in a concentration range from approximately 40 wt. % to approximately 60 wt. %, silica sand in a concentration range from approximately 40 wt. % to approximately 60 wt. %, alumina silicate (perlite) in a concentration range from approximately 0.5 wt. % to approximately 3 wt. %, and poly(ethylene-vinyl acetate) in a concentration range from approximately 0.5 wt. % to approximately 1.0 wt. %.

As an example that may be particularly useful for use in colder climates, the dry concrete mix can include Portland cement in a concentration range from approximately 30 wt. % to approximately 60 wt. %, silica sand, alumina silicate (perlite) in a concentration range from approximately 0.5 wt. % to approximately 3 wt. %, and poly(ethylene-vinyl acetate) in a concentration range from approximately 15 wt. % to approximately 30 wt. %. For certain applications, the dry concrete mix can include Portland cement in a concentration range from approximately 40 wt. % to approximately 60 wt. %, silica sand in a concentration range from approximately 25 wt. % to approximately 50 wt. %, alumina silicate (perlite) in a concentration range from approximately 4 wt. % to approximately 6 wt. %, and poly(ethylene-vinyl acetate) in a concentration range from approximately 15 wt. % to approximately 30 wt. %. As yet another example, the dry concrete mix can include Portland cement in a concentration range from approximately 35 wt. % to approximately 45 wt. %, silica sand in a concentration range from approximately 30 wt. % to approximately 40 wt. %, alumina silicate (perlite) in a concentration range from approximately 4 wt. % to approximately 6 wt. %, and poly(ethylene-vinyl acetate) in a concentration range from approximately 15 wt. % to approximately 25 wt. %.

As yet another example, the dry concrete mix can include Portland cement in a concentration range from approximately 40 wt. % to approximately 60 wt. %, silica sand in a concentration range from approximately 25 wt. % to approximately 50 wt. %, alumina silicate (perlite) in a concentration range from approximately 4 wt. % to approximately 6 wt. %, and poly(ethylene-vinyl acetate) in a concentration range from approximately 15 wt. % to approximately 30 wt. %.

Yet another example of the dry concrete mix can include Portland cement, silica sand, alumina silicate, and poly (ethylene-vinyl acetate). As a more specific example, the dry concrete mix can include Portland cement in a concentration range from approximately 30 wt. % to approximately 60 wt. %, silica sand, alumina silicate (perlite) in a concentration range from approximately 1 wt. % to approximately 6 wt. %, and a latex and/or acrylic polymer, such as poly(ethylene-vinyl acetate) powder in a concentration range from approximately 1 wt. % to approximately 30 wt. %. As another example, the dry concrete mix can include Portland cement in a concentration range from approximately 30 wt. % to approximately 60 wt. %, silica sand in a concentration range from approximately 25 wt. % to approximately 60 wt. %, alumina silicate (perlite) in a concentration range from approximately 1 wt. % to approximately 6 wt. %, and poly(ethylene-vinyl acetate) or a latex and/or acrylic polymer powder in a concentration range from approximately 1 wt. % to approximately 30 wt. %.

As a further example, the dry concrete mix can include Portland cement in a concentration range from approximately 40 wt. % to approximately 60 wt. %, silica sand, alumina silicate (perlite) in a concentration range from approximately 0.5 wt. % to approximately 3 wt. %, and a dry, redispersible latex polymer powder, such as poly(ethylene-vinyl acetate), in a concentration range from approximately 0.5 wt. % to approximately 3 wt. %. For certain applications, the dry concrete mix consists essentially of Portland cement in a concentration range from approximately 40 wt. % to approximately 60 wt. %, silica sand in a concentration range from approximately 40 wt. % to approximately 60 wt. %, alumina silicate (perlite) in a concentration range from approximately 0.5 wt. % to approximately 3 wt. %, a latex and/or acrylic polymer (e.g., dry, redispersible powders), such as poly(ethylene-vinyl acetate), in a concentration range from approximately 0.5 wt. % to approximately 1.0 wt. %.

As another example that can be useful in colder climates for example, the dry concrete mix can include Portland cement in a concentration range from approximately 30 wt. % to approximately 60 wt. %, silica sand, alumina silicate (perlite) in a concentration range from approximately 0.5 wt. % to approximately 3 wt. %, and latex and/or acrylic polymers such as, but not limited to, poly(ethylene-vinyl acetate), in a concentration range from approximately 5 wt. % to approximately 30 wt. %. As another example, for example for use in colder climates, the dry concrete mix can include Portland cement in a concentration range from approximately 30 wt. % to approximately 60 wt. %, silica sand, alumina silicate (perlite) in a concentration range from approximately 0.5 wt. % to approximately 3 wt. %, and dry, latex polymer powders such as, but not limited to, poly (ethylene-vinyl acetate) in a concentration range from approximately 20 wt. % to approximately 30 wt. %. For certain applications, the dry concrete mix consists essentially of Portland cement in a concentration range from approximately 40 wt. % to approximately 60 wt. %, silica sand in a concentration range from approximately 25 wt. % to approximately 50 wt. %, alumina silicate (perlite) in a concentration range from approximately 4 wt. % to approximately 6 wt. %, and poly(ethylene-vinyl acetate) in a concentration range from approximately 10 wt. % to approximately 19 wt. %. In still another example, the dry concrete mix can include Portland cement in a concentration range from approximately 35 wt. % to approximately 45 wt. %, silica sand in a concentration range from approximately 30 wt. % to approximately 40 wt. %, alumina silicate (perlite) in a concentration range from approximately 4 wt. % to approximately 6 wt. %, and poly(ethylene-vinyl acetate) in a concentration range from approximately 15 wt. % to approximately 25 wt. %.

As an additional example, the dry concrete mix can include Portland cement in a concentration range from approximately 25 wt. % to approximately 60 wt. %, silica sand in a concentration range from approximately 25 wt. % to approximately 60 wt. %, alumina silicate (perlite) in a concentration range from approximately 0.5 wt. % to approximately 5 wt. %, and latex and/or acrylic polymers in a concentration range from approximately 0.5 wt. % to approximately 8 wt. %. As another example, the dry concrete mix can include Portland cement in a concentration range from approximately 40 wt. % to approximately 65 wt. %, silica sand in a concentration range from approximately 40 wt. % to approximately 65 wt. %, alumina silicate (perlite) in a concentration range from approximately 0.5 wt. % to approximately 5 wt. %, and latex and/or acrylic polymers in a concentration range from approximately 0.5 wt. % to approximately 8 wt. %.

As an additional example, the dry concrete mix can include Portland cement in a concentration range from approximately 20 wt. % to approximately 40 wt. %, silica sand in a concentration range from approximately 30 wt. % to approximately 79 wt. %, alumina silicate (perlite) in a concentration range from approximately 0.5 wt. % to approximately 6 wt. %, and latex and/or acrylic polymers in a concentration range from approximately 0.5 wt. % to approximately 5 wt. %. As yet another example, the dry concrete mix can include Portland cement in a concentration range from approximately 20 wt. % to approximately 30 wt. %, silica sand in a concentration range from approximately 30 wt. % to approximately 79 wt. %, alumina silicate (perlite) in a concentration range from approximately 0.5 wt. % to approximately 6 wt. %, and latex and/or acrylic polymers in a concentration range from approximately 0.5 wt. % to approximately 5 wt. %. As yet another example, the dry concrete mix can include Portland cement in a concentration range from approximately 21 wt. % to approximately 40 wt. %, silica sand in a concentration range from approximately 30 wt. % to approximately 78 wt. %, alumina silicate (perlite) in a concentration range from approximately 0.5 wt. % to approximately 6 wt. %, and latex and/or acrylic polymers in a concentration range from approximately 0.5 wt. % to approximately 5 wt. %. As yet another example, the dry concrete mix can include Portland cement in a concentration range from approximately 25 wt. % to approximately 35 wt. %, silica sand in a concentration range from approximately 30 wt. % to approximately 74 wt. %, alumina silicate (perlite) in a concentration range from approximately 0.5 wt. % to approximately 6 wt. %, and latex and/or acrylic polymers in a concentration range from approximately 0.5 wt. % to approximately 5 wt. %.

As an additional example, the dry concrete mix can include Portland cement in a concentration range from approximately 23 wt. % to approximately 70 wt. %, silica sand in a concentration range from approximately 30 wt. % to approximately 75 wt. %, alumina silicate (perlite) in a concentration range from approximately 0.5 wt. % to approximately 6 wt. %, and latex and/or acrylic polymers in a concentration range from approximately 0.5 wt. % to approximately 8 wt. %.

While the various example formulations or compositions are expressly described herein as "comprising" or "including" certain materials (often in relation to certain concentration ranges), it is to be understood that the disclosure fully contemplates formulations or compositions that "consist essentially of" the described combinations and/or concentration ranges of materials.

The disclosed technology includes methods for installing paver tiles using the disclosed paver adhesives. The method can include cleaning the substrate or area where the paver tiles are to be installed (e.g., concrete pad), such as by power washing the surface of the substrate. It is preferable to wait for the surface to become substantially dry before continuing the method.

The method can include distributing the paver adhesive on the substrate while the paver adhesive is in a dry state (e.g., in powder form). For example, the method can include spreading a layer of the paver adhesive over a concrete pad. The paver adhesive can be distributed or spread to have a substantially uniform depth. Any useful amount of dry paver adhesive can be applied. For example, the layer of the applied paver adhesive can have a depth in the range between approximately 0.25 inch to approximately 0.5 inch.

It can be helpful to apply additional paver adhesive (e.g., a thicker layer), for example, in areas of the substrate that are uneven, have dips, or other deformities. It is preferable to not exceed a dry paver adhesive thickness of 1.5 inches. Additional paver adhesive can be applied, but this may increase the difficulty or amount of water required for subsequently hydrating the paver adhesive (as explained more fully below) and/or the amount of time required for the paver adhesive to cure and/or harden.

The method can include covering any existing expansion joints or cracks of the substrate with the paver adhesive. Small cracks (e.g., up to 0.75 inch) can be covered with the paver adhesive. If the substrate is damaged to a greater extent than small cracks, it may be necessary to cut out the corresponding portion of the substrate to the full depth of the substrate and repair the corresponding portion of the substrate prior to continuing the disclosed method. For example, repairing a portion of the substrate can include refilling the removed portion of the substrate with concrete or the like using rebar, which can help provide adequate strength for the substrate.

The method can include laying (e.g., setting, positioning) paver tiles over or atop the dry paver adhesive. It may be helpful to lay paver tiles to track any outer edges of the substrate and/or to abut any structures adjacent to the substrate (e.g., a house, a building, a retaining wall). That is, it may be helpful to create a border of paver tiles. Optionally, the method can include cutting a groove in the substrate at or near the border. The groove can provide a channel for increased paver adhesive depth, which can help enhance bond strength between the border tiles and the substrate. Similarly, it may be beneficial to cut two substantially parallel grooves at or near the border of the substrate.

If desired, it can be helpful use a wet mortar to lay the border tiles. For example, the method can include mixing a latex modifier and/or hydrating the paver adhesive to create a wet mortar and spreading the wet mortar along the border area of the substrate. The corresponding border tiles can then be laid atop the wet mortar bed and permitted to cure and/or harden. This can enable a user to create a solidified border without wetting the interior area where the dry paver adhesive is located or will be applied.

Once paver tiles have been placed atop the dry paver adhesive, the method can include hydrating the dry paver adhesive, which can include spraying or otherwise applying water atop the installed paver tiles and the underlying paver adhesive. Once the paver adhesive has been sufficiently hydrated, the method can include spreading or distributing mason sand over the installed paver tiles to fill joints. Once hydrated, the method can include permitting the paver adhesive to cure and/or harden and to gain strength before beginning normal use. For example, it may be necessary to wait approximately 24 hours to approximately 72 hours before beginning normal use.

The disclosed technology can enable secure adhesion of paver tiles to a substrate. As will be appreciated, the layer of paver tiles above the hydrated paver adhesive can serve as a curing membrane to prevent rapid evaporation of the water in the hydrated paver mix. Further, any border construction made by laying down a wet mortar bed and a layer of paver tiles can serve to contain the hydrating water subsequently applied to the interior portion of paver tiles laid atop the dry paver adhesive and thus preventing hydraulic pressure from "washing out" the dry paver adhesive from beneath the interior paver tiles.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

What is claimed is:

1. A dry concrete mix for dry setting paver tiles, the dry concrete mix comprising:
    cement;
    silica sand;
    alumina silicate; and
    a latex polymer and/or acrylic polymer in a concentration range from approximately 0.5 wt. % to approximately 4 wt. %.

2. The dry concrete mix of claim 1, wherein the cement is in a concentration range from approximately 23 wt. % to approximately 70 wt. %.

3. The dry concrete mix of claim 1, wherein the latex polymer and/or acrylic polymer is dry and redispersible.

4. The dry concrete mix of claim 1, wherein the latex polymer and/or acrylic polymer comprises poly(ethylene-vinyl acetate).

5. The dry concrete mix of claim 1, wherein the silica sand has a concentration range from approximately 30 wt. % to approximately 75 wt. %.

6. The dry concrete mix of claim 1, wherein the cement has a concentration range from approximately 25 wt. % to approximately 60 wt. %.

7. The dry concrete mix of claim 1, wherein the cement is Portland cement.

8. The dry concrete mix of claim 7, wherein the Portland cement comprises:
    Type I cement in a concentration range from approximately 40 wt. % to approximately 60 wt. %; and
    Type III cement in a concentration range from approximately 40 wt. % to approximately 60 wt. %.

9. A dry concrete mix for dry setting paver tiles, the dry concrete mix comprising:
    cement in a concentration range from approximately 20 wt. % to approximately 40 wt. %;
    silica sand;
    alumina silicate; and
    a latex polymer and/or acrylic polymer in a concentration range from approximately 0.5wt. % to approximately 4 wt. %.

10. The dry concrete mix of claim 9, wherein the cement has a concentration range from approximately 21 wt. % to approximately 30 wt. %.

11. The dry concrete mix of claim 9, wherein the latex polymer and/or acrylic polymer is dry and redispersible.

12. The dry concrete mix of claim 9, wherein the latex polymer and/or acrylic polymer comprises poly(ethylene-vinyl acetate).

13. The dry concrete mix of claim 9, wherein the silica sand has a concentration range from approximately 30 wt. % to approximately 70 wt. %.

14. The dry concrete mix of claim 9, wherein the alumina silicate has a concentration range from approximately 0.5 wt. % to approximately 6 wt. %.

15. The dry concrete mix of claim 9, wherein the cement is Portland cement.

16. The dry concrete mix of claim 15, wherein the Portland cement comprises:
    Type I cement in a concentration range from approximately 40 wt. % to approximately 60 wt. %; and
    Type III cement in a concentration range from approximately 40 wt. % to approximately 60 wt. %.

* * * * *